No. 782,026. PATENTED FEB. 7, 1905.
EDWARD HENRY, DEC'D.
EDWARD HENRY, JR., ADMINISTRATOR.
WATER SPRINKLER OR STREET WASHER.
APPLICATION FILED OCT. 21, 1903.
2 SHEETS—SHEET 1.
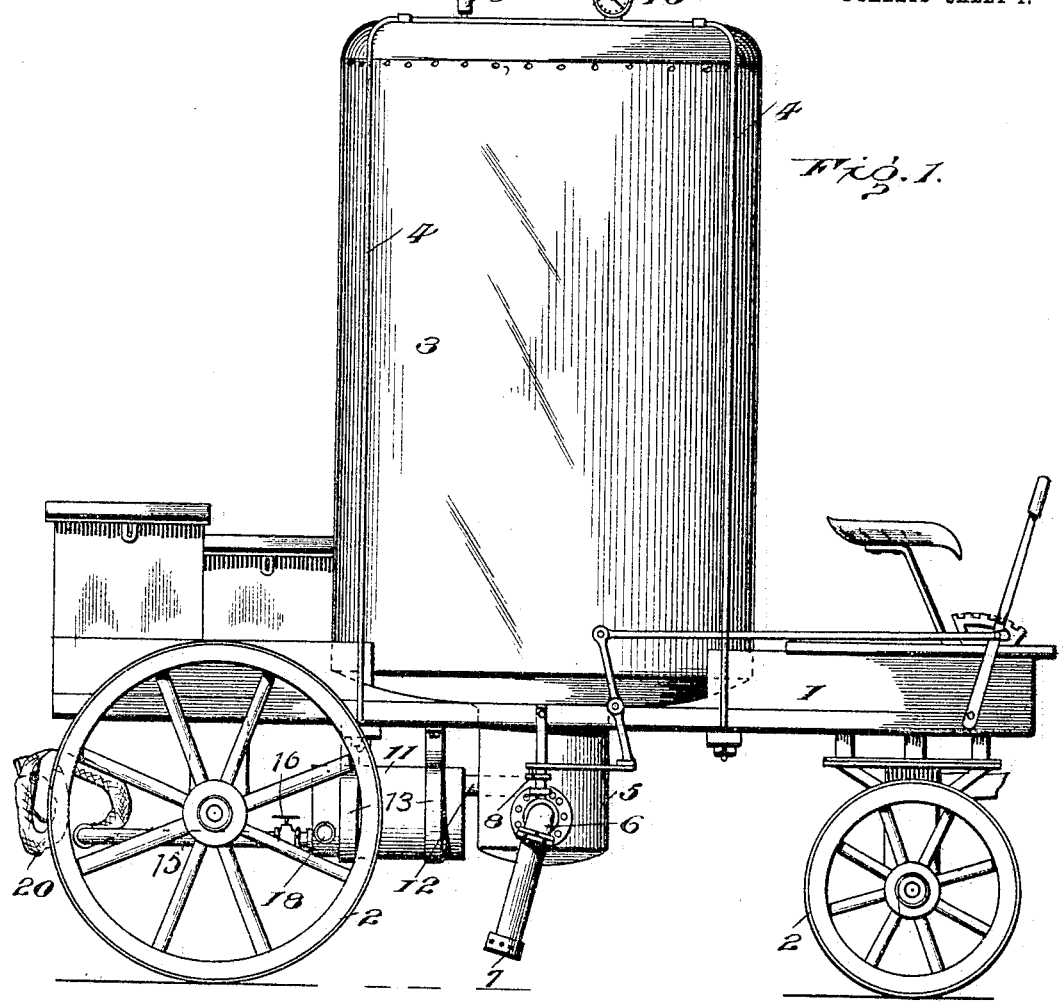
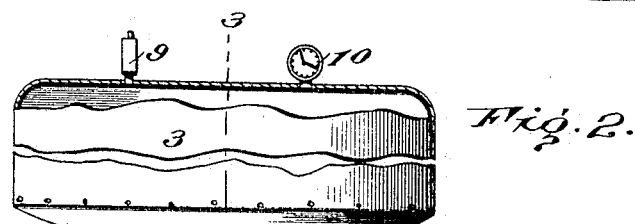
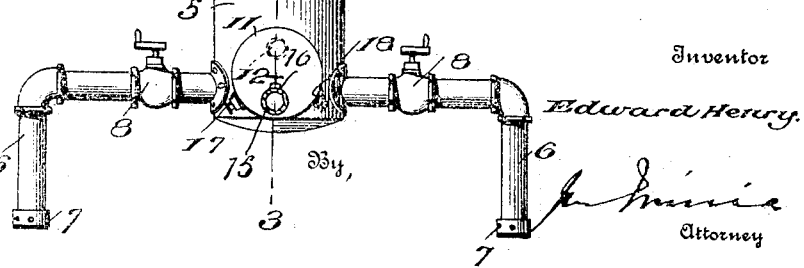
Witnesses
Inventor
Edward Henry.
Attorney

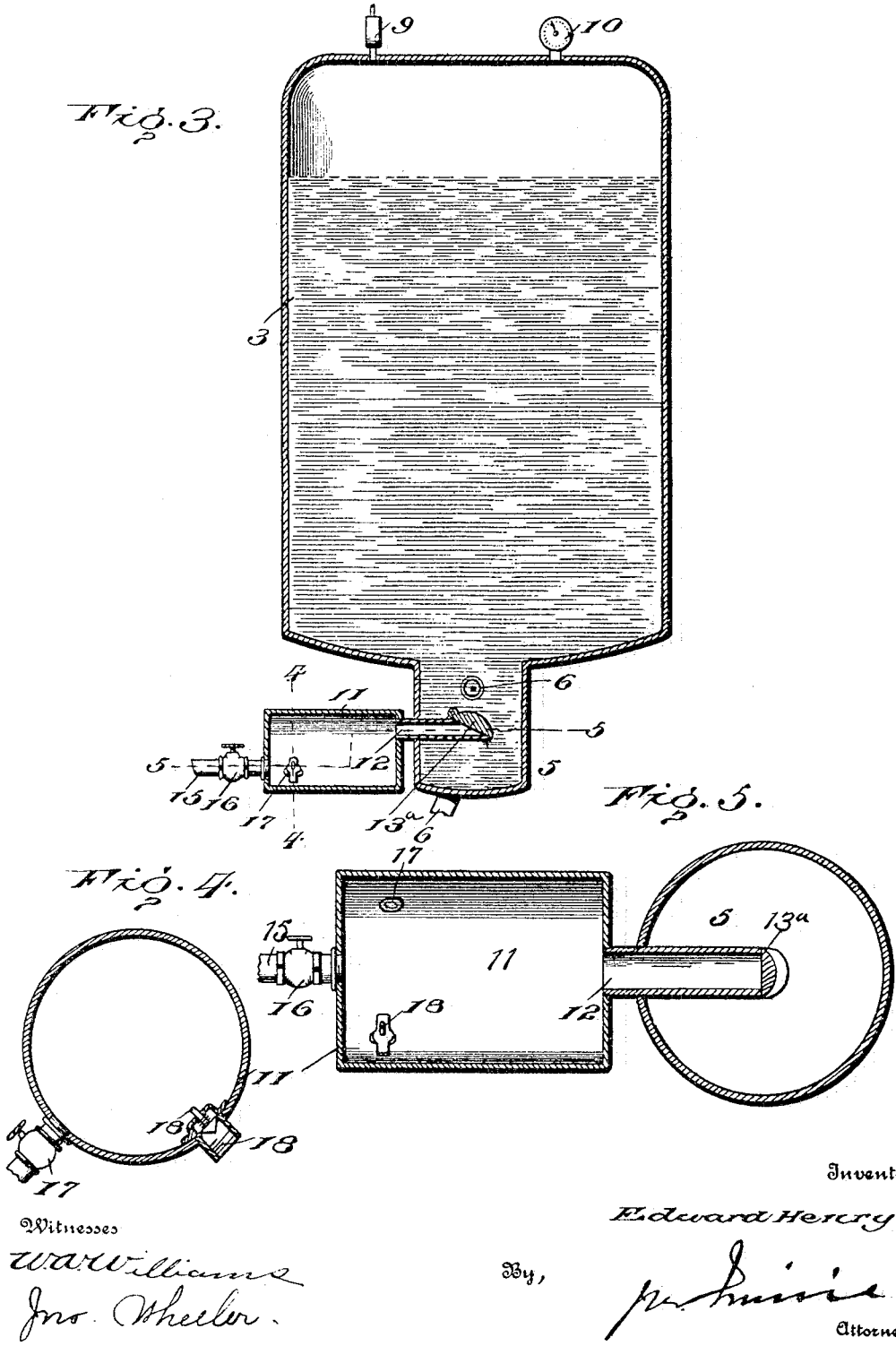

No. 782,026. Patented February 7, 1905.

UNITED STATES PATENT OFFICE.

EDWARD HENRY, OF EAST ST. LOUIS, ILLINOIS; EDWARD HENRY, JR., ADMINISTRATOR OF SAID EDWARD HENRY, DECEASED.

WATER-SPRINKLER OR STREET-WASHER.

SPECIFICATION forming part of Letters Patent No. 782,026, dated February 7, 1905.

Application filed October 21, 1903. Serial No. 177,843.

*To all whom it may concern:*

Be it known that I, EDWARD HENRY, a citizen of the United States, residing at East St. Louis, in the county of St. Clair and State of Illinois, have invented new and useful Improvements in Water-Sprinklers or Street-Washers, of which the following is a specification.

My invention relates to an improvement in a street-washing apparatus of the type wherein compressed air is employed to assist in forcing the water through the washing or sprinkling devices.

In the embodiment of my invention I provide a water-tank and an auxiliary exhaust-air chamber located with relation to each other that in supplying water to the tank it must pass through the air-chamber. The prime object of this relationship is to cause the water from the street-plugs to introduce the air in the chamber into the tank to apply pressure on said water to add force to it when washing. Furthermore, I provide valves in the air-chamber that when the tank has been filled the chamber is drained and air may again be introduced with the next supply of water to the tank.

In the drawings, Figure 1 is a side elevation of my improvement as applied to an ordinary street-sprinkler. Fig. 2 is an end view of the same, the vehicle being omitted. Fig. 3 is a vertical section on the line 3 3 of Fig. 2. Fig. 4 is a transverse section on the line 4 4 of Fig. 3. Fig. 5 is a horizontal section on the line 5 5 of Fig. 3.

The same numerals refer to like parts in all the figures.

1 indicates a vehicle mounted on wheels 2; 3, a water-tank, and 4 represents braces to support the tank. The tank is reduced at its lower end, as at 5, and connected thereto are pipes 6 6, which are bent downwardly at their outer ends and are provided with washers or sprinklers 7 of any approved pattern.

8 represents valves in the pipes 6 for regulating the exit of water from the tank, said valves being operated by suitable means located in convenient reach of the driver's seat. At the upper end of the tank is a whistle 9 and a pressure-gage 10.

The features thus far described are of well-known construction and only form a part of my present invention, in combination with the features to be hereinafter mentioned.

A chamber 11 is connected to the reduced portion 5 of the tank 3 by a pipe 12, and it is supported by braces 13, attached to the vehicle. The pipe 12 enters the tank near its bottom, and at its inner end and bottom the tank is provided with a check-valve $13^a$, opening inwardly at the appropriate time, communication with the said tank being effected when the combined pressure of air and water is introduced in the chamber. A supply-pipe 15, provided with a valve 16, enters the air-chamber 11 below the valve $13^a$, and on the opposite side of the latter are valves 17 and 18. The valve 17 is for the purpose of exhausting the water from the chamber, while the check-valve 18 is used to charge the tank with air.

In operating my invention the valve 17 is closed, a hose 20 is connected with a water-supply, and the valve 16 is opened and the pressure of water rushing in forces the air within the air-chamber against the valve $13^a$ and enters the tank, and the air being the lightest ascends to the top of the tank. As the volume of water rushes in the tank it compresses the air above it, which acting on the water greatly accelerates the washing or sprinkling, as the case may be. The tank having been filled with water, the valve 16 is closed, the hose disconnected, and the valve 17 is opened to drain the chamber of water. Immediately the draining commences the pressure in the tank closes the check-valve and prevents the water in the tank from flowing out.

It will be noted that the main tank is practically closed against the admission of air except that forced in in the use of the chamber 11. It is therefore evident that the continued reuse of the sprinkler will in a measure exhaust the air normally within the tank by absorption, this being particularly true when the tank is refilled a number of times before the complete emptying of the tank. The absorption would exhaust the air in the tank in a large degree, and hence in each refilling the water would be subjected to the pressure of a gradually-reducing volume of air. This of course would practically defeat my object, and it is to avoid this result that the additional chamber 11 is used. At each refilling of the tank the air normally within the chamber 11 is forced into the body of the tank, thus renewing the air withdrawn from the tank by absorption and in the use of the whistle. It is therefore at once apparent that the chamber 11 is a material feature of the invention and that it must be located to permit its contained volume of air to be forced into the main tank by the incoming water.

It will therefore be seen that by providing a tank and a check-valve positioned with relation to the water-tank, so that water introduced to the latter has to pass through the chamber, enables me to automatically take in a supply of air and compress it at the same time to force the water from the tank.

I may find it expedient to charge the chamber with air to act on the water in the tank and replenish the supply when the pressure on the water falls below a predetermined point. To accomplish this operation, a supply of air is introduced to the chamber after the tank has been filled. If there is fifty pounds pressure of air to the square inch above the volume of water and this should be decreased by using the whistle or by leakage, the pressure of air in the chamber 11 is regulated so that immediately the decrease takes place the check-valve 13$^a$ is forced open and the supply of air rushes in above the water and replenishes the pressure.

It will therefore be seen that my invention accelerates the washing and comprehends maintaining a uniform air-pressure on the volume of water to equally distribute the supply of water with great force.

What I claim as new is—

1. A sprinkling apparatus, comprising a water-tank normally closed against the admission of air, and an air-chamber communicating with the tank, said chamber being in the path of the incoming water-supply when filling the tank and being closed against the admission of water from the tank.

2. A sprinkling apparatus comprising a water-tank normally closed against the admission of air, an air-chamber communicating with the tank, a water-inlet leading into the chamber, a valve between the chamber and tank to close the former against the latter, and an outlet from the tank.

3. A sprinkling apparatus comprising a tank normally closed against the admission of air, a water-inlet to the tank, a water-outlet from the tank, an air-chamber located in the path of the inlet but out of the path of the outlet, means for closing the chamber against admission from the tank, and means for exhausting the chamber without affecting the tank.

In testimony whereof I have signed my name to this specification in the presence of two subscribing witnesses.

EDWARD HENRY.

Witnesses:
J. M. CHAMBERLIN, Jr.,
HARRY S. KRAMER.